Oct. 31, 1933.    F. W. GEHRKE    1,932,817
CONDENSER FOR FILM PROJECTORS
Filed Dec. 14, 1929

Friedrich Wilhelm Gehrke, Inventor,
By Philip S. Hopkins, Attorney.

Patented Oct. 31, 1933

1,932,817

UNITED STATES PATENT OFFICE 1,932,817

CONDENSER FOR FILM-PROJECTORS

Friedrich Wilhelm Gehrke, Munich, Germany, assignor to Agfa Ansco Corporation, Binghamton, N. Y., a corporation of New York Application December 14, 1929, Serial No. 414,051, and in Germany December 17, 1928

3 Claims. (Cl. 88—24)

My present invention relates to optical systems for projectors for exhibiting cinematograph pictures. One object of the invention is the provision of a new condenser producing a large and regular amount of light on the picture screen by conducting the amount of light proceeding from the projector lamp to the objective with loss as small as possible.

A further advantage of my condenser is that it shall be inexpensive to manufacture and easily assembled.

I have met the requirements outlined above in a condenser comprising a plurality of lenses which partly have a different diameter or aperture and which are arranged in such a manner that the beam of light emitted by the illuminating lamp passes with its center through the whole lens system while the peripheral rays of the illuminating pencil are influenced only by some of the lenses.

As known in the art, in condensers of high luminous intensity the peripheral rays of the light-field are more intensively refracted than the central rays, so that they cannot be used for the projection. In my new condenser, however, the central rays of the luminous pencil are united with the peripheral rays in such a manner, that they intersect exactly or approximately exactly the same point. This result can be attained, if the central rays emitted from the source of light penetrate all collecting members of the condenser, while the peripheral rays of the light-field pass only through a few of the lenses of the condenser.

Besides the complete utilization of the rays, the use of the new condenser involves the advantage that the lens adjacent the source of light (front lens) is of a slight vertical thickness and is also farther removed from the illuminating point, so that the risk of the front lens becoming cracked is avoided. According to the present invention, the total aperture of the condensers can be greater than with the known spherical types, because in consequence of the flatter radii of the condenser and the diameter of the front lens which is a priori very small, the diameters of the condenser are not limited in any way.

The accompanying drawing shows by way of example one mode of construction of the present invention.

Figure 1:
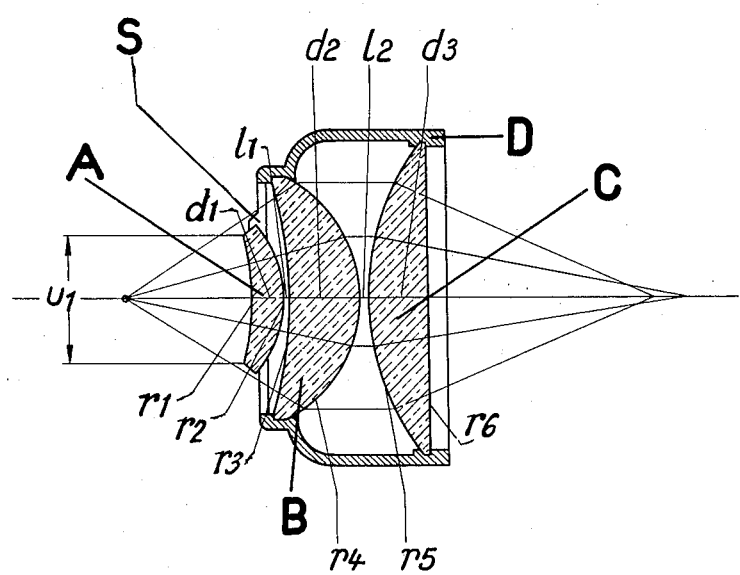
Figure 2:
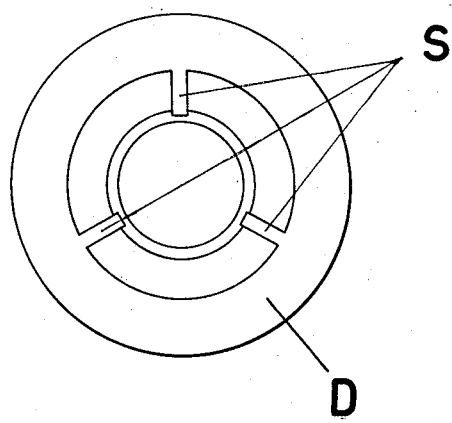

Fig. 1 is a longitudinal section of the condenser and Fig. 2 is a view from behind (seen from the source of light).

In the drawing A, B and C are three lenses mounted in a lens casing D. The front lens A having a distinct smaller aperture or diameter than the lenses B and C, is mounted in the lens-casing D by bridges S (see Fig. 2) in such a manner that its optical axis coincides with the optical axis of the lenses B and C and that the light rays passing its periphery penetrate the other lenses.

In the accompanying table are set forth the data of a preferred example, the radii of the successive surfaces from front to back being designated $r_1$ to $r_6$, the thicknesses of the successive lenses $d_2$ to $d_3$ and the width of the successive air spaces $l_1$ and $l_2$. There is given also the index of refraction of the glass for the D-line and the aperture of the lenses. All the line or dimensions are in millimeters.

Table for condenser with focal length 13.2 mm.

| Lens | Glass | Radii | Thickness | Separations | Aperture |
|---|---|---|---|---|---|
| A | Hard glass $n_D=1.520$ | $r_1=-25.0$ | $d_1=3.0$ | | 14.5 |
|   |   | $r_2=-11.2$ | | $l_1=0.5$ | |
| B | Plate glass $n_D=1.523$ | $r_3=-40.0$ | $d_2=6.8$ | | 24.0 |
|   |   | $r_4=-13.2$ | | $l_2=0.8$ | |
| C | Plate glass $n_D=1.523$ | $r_5=+25.0$ | $d_3=6.0$ | | 34.0 |
|   |   | $r_6=\infty$ | | | |

This attachment placed in front of a light source E and presenting its face $r_1$ towards the light produces a large and regular amount of light on the picture screen. The bridges S which are required for holding the front lens A, can be made as narrow as desired, so that the loss of light caused by them is practically of no importance. As seen from the adhering drawing, the rays emitted by the illuminating lamp E in the space $u_1$ penetrate the three lenses A, B and C of the condenser, while the other rays, the peripheral rays, only pass through the lenses B and C to intersect exactly with the central rays at the same point. In the same manner the pencil of rays may of course be further subdivided by giving to the third lens C in a triple condenser a still larger diameter and by interrupting the mounting between the front lens and the second lens as between the second and third lens to give way to the rays which are not refracted by the said two lenses.

What I claim is:—

1. In a projecting system for motion picture apparatus in operative combination a source of light, a condenser comprising a plurality of lens elements, the lens next to the source of light having a distinctly smaller aperture than the other lenses, being coaxially mounted with the latter and positioned inside the cone formed by the aperture of the following lens and said source of light, its circumference being smaller than that of the cone when cut by a plane determined by the circumference of said lens of smaller aperture, and means for connecting said lens next to the source of light to the other lenses, said means being arranged in such a manner that they prevent as little light as possible from striking said following lens directly.

2. In a projecting system for motion picture apparatus in operative combination a source of light, a condenser comprising three lens elements, the lens next to the source of light having a distinctly smaller aperture than the other lenses, being coaxially mounted with the latter and positioned inside the cone formed by the aperture of the following lens and said source of light, its circumference being smaller than that of the cone when cut by a plane determined by the circumference of said lens of smaller aperture, and means for connecting said lens next to the source of light to the other lenses, said means being arranged in such a manner that they prevent as little light as possible from striking said following lens directly.

3. In a projecting system for motion picture apparatus in operative combination a source of light, a condenser comprising three lens elements arranged in a casing, the lens next to the source of light having a distinctly smaller aperture than the other lenses, being coaxially mounted with the latter and positioned inside the cone formed by the aperture of the following lens and said source of light, its circumference being smaller than that of the cone when cut by a plane determined by the circumference of said lens of smaller aperture, and a bridge comprising three narrow pieces provided in said casing and holding the lens next to the source of light in its coaxial position with the following lens.

FRIEDRICH WILHELM GEHRKE.